United States Patent [19]

Jurden

[11] Patent Number: 4,557,008
[45] Date of Patent: Dec. 10, 1985

[54] DOCK LEVELER SEAL CONSTRUCTION

[75] Inventor: Jerry E. Jurden, Lawrenceville, Ga.

[73] Assignee: Flexion, Inc., Pittsburgh, Pa.

[21] Appl. No.: 531,170

[22] Filed: Sep. 9, 1983

[51] Int. Cl.$^4$ .............................................. E01D 1/00
[52] U.S. Cl. ..................................... 14/71.7; 14/71.1; 14/71.3
[58] Field of Search ...................... 14/71.1, 71.3, 71.7

[56] References Cited

U.S. PATENT DOCUMENTS

| 3,255,478 | 6/1966 | Lambert | 14/71.7 |
| 3,363,273 | 1/1968 | Chitwood et al. | 14/71.7 |
| 3,456,274 | 7/1969 | McGuire | 14/71.7 |
| 3,886,615 | 6/1975 | Metro | 14/71.3 |
| 4,110,860 | 9/1978 | Neff et al. | 14/71.7 |
| 4,118,817 | 10/1978 | Burnham | 14/71.3 |
| 4,422,199 | 12/1983 | Frommelt | 14/71.3 X |

Primary Examiner—Stephen L. Novosad
Assistant Examiner—Beverly E. Hjorth
Attorney, Agent, or Firm—Joseph P. Gastel

[57] ABSTRACT

A seal construction for a dock leveler having a platform with opposite sides which moves vertically relative to the sides of a pit, including a pair of curtain members each having first and second opposite edges, with the first edges removably attached to the sides of the platform and the second edges removably attached to the sides of the pit, the curtain members sealing the clearance openings between the sides of the platform and the sides of the pit and also sealing the opening which would otherwise be produced between the sides of the pit and the platform when the latter is in an elevated position.

20 Claims, 11 Drawing Figures

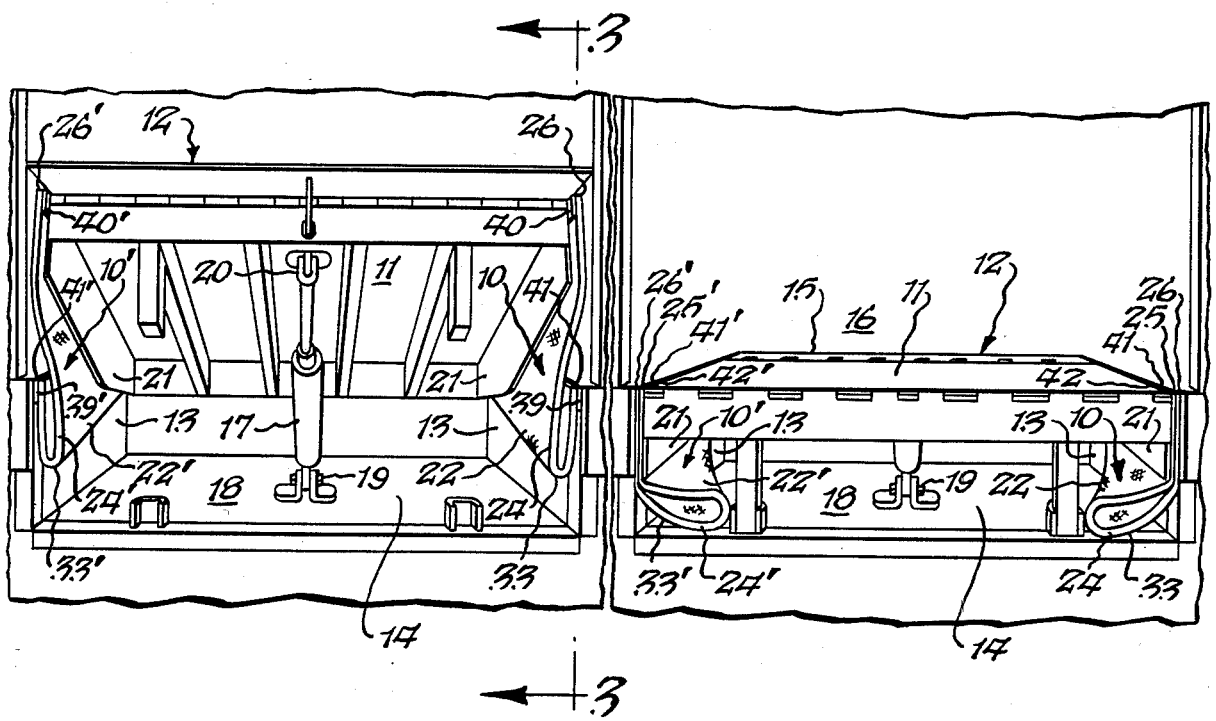
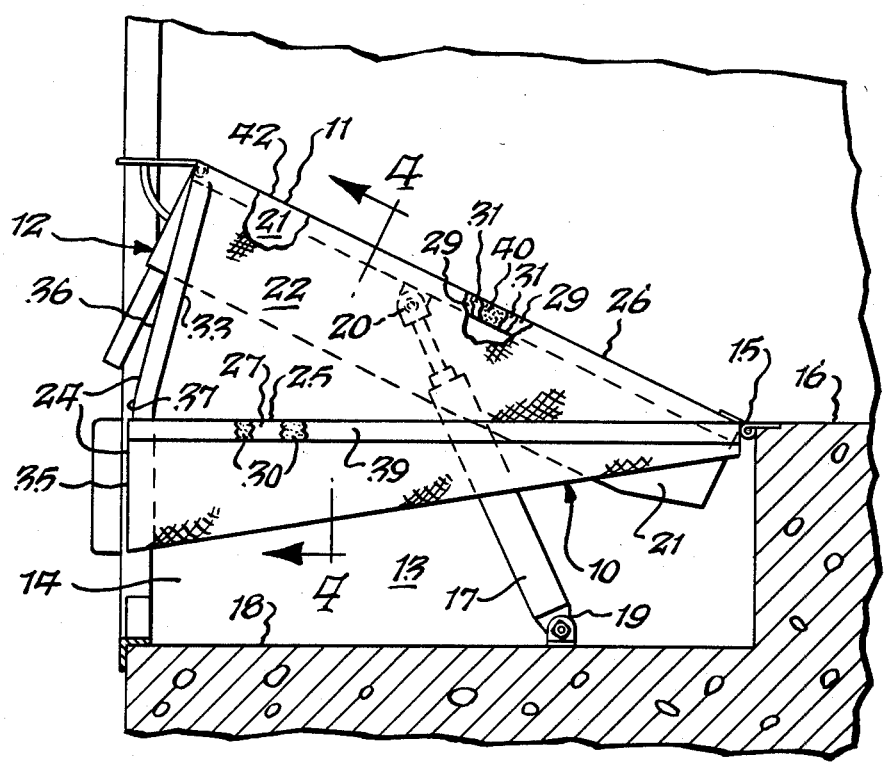

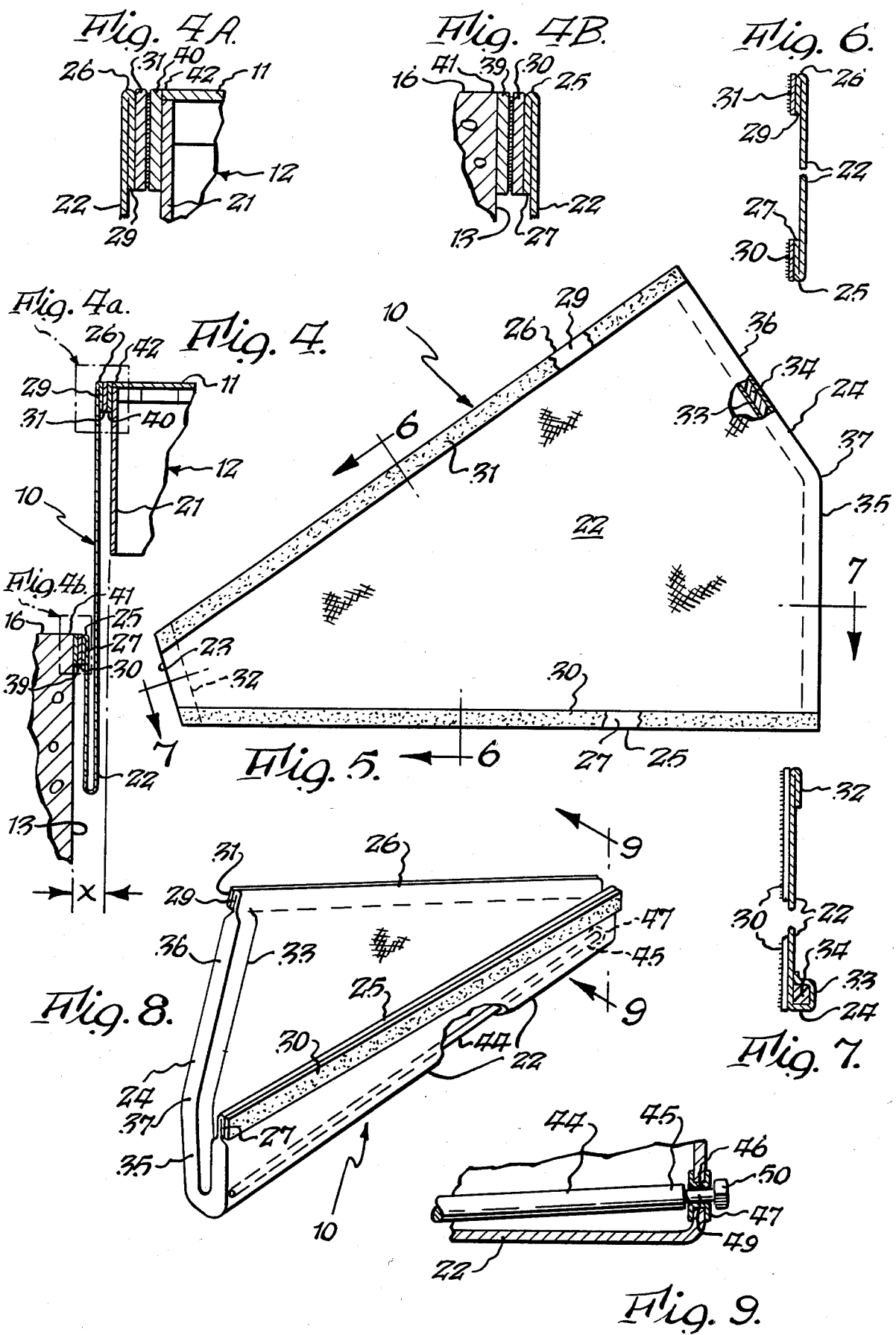

DOCK LEVELER SEAL CONSTRUCTION

BACKGROUND OF THE INVENTION

The present invention relates to a seal construction for a dock leveler.

By way of background, dock levelers are used in buildings such as warehouses as a bridge between the warehouse floor and trucks of different heights. A dock leveler usually comprises a platform which is pivoted relative to the warehouse floor at one end and includes a free end which is brought level with the truck bed. Usually the platform is located immediately above a pit or recess in the floor which houses the actuating mechanism for the platform. There are clearance openings between the sides of the platform and the sides of the pit through which there can be air flow, and through which there can be an influx of insects and rodents. In addition, there are large openings proximate the sides of the platform when the platform is moved to a position above the floor. The air flow is undesirable both in winter and summer because there can be loss of heat and air conditioning, respectively. Furthermore, the influx of insects and rats is highly undesirable for obvious reasons. In addition, refuse from the warehouse floor can fall into the pit through the openings, especially when the platform is elevated, and thus may constitute a health hazard, as well as attracting insects, small animals and rodents.

SUMMARY OF THE INVENTION

It is one object of the present invention to provide a seal construction for a dock leveler which effectively seals the openings between a dock leveler platform and the sides of an associated pit, to thereby prevent air flow, influx of insects and rodents into a building, and the passage of refuse from the building into the pit associated with the dock leveler.

Another object of the present invention is to provide a dock leveler seal construction which can be readily installed and removed in an extremely simple and expedient manner for cleaning and repair.

A further object of the present invention is to provide a dock leveler seal construction fabricated from flexible sheet material which will remain straight and taut when it is in an extended position.

Still another object of the present invention is to provide an improved dock leveler seal construction in which sheet-like members will fold into a compact condition beneath the dock leveler platform when the latter is in a horizontal position or below, and while folded will still seal the clearance space between the sides of the platform and the sides of the pit. Other objects and attendant advantages of the present invention will readily be perceived hereafter.

The present invention relates to a seal construction for a dock leveler having a platform with first opposite sides which move vertically relative to second opposite sides of a pit adjacent said first opposite sides of said platform, said seal construction comprising a pair of curtain members each having first and second edges, first means for securing one of each of said first edges to one of each of said first opposite sides of said platform, second means for securing one of each of said second edges to one of each of said second opposite sides of said pit, said curtain members having a sufficient expanse between said first and second edges so that they block the openings between said first sides of said platform and said second sides of said pit in all positions of said platform.

The various aspects of the present invention will be more fully understood when the following portions of the specification are read in conjunction with the accompanying drawings wherein:

BRIEF DESCRIPTION OF THE DRAWINGS

FIG. 1 is a front elevational view partially in perspective showing the improved seal of the present invention mounted on opposite sides of a dock leveler, the platform of which is in an elevated position;

FIG. 2 is a view similar to FIG. 1 but showing the platform in a horizontal position and also showing the manner in which the seals on opposite sides assume a folded condition;

FIG. 3 is a fragmentary view taken substantially in the direction of arrows 3—3 of FIG. 1;

FIG. 4 is a fragmentary cross sectional view taken substantially along line 4—4 of FIG. 3;

FIG. 4A is an enlarged fragmentary view of the circled portion of FIG. 4 which is designated FIG. 4A;

FIG. 4B is an enlarged fragmentary view of the circled portion of FIG. 4 which is designated FIG. 4B;

FIG. 5 is a plan view of the curtain member which comprises the seal laid out flat;

FIG. 6 is a fragmentary cross sectional view taken substantially along line 6—6 of FIG. 5;

FIG. 7 is a fragmentary cross sectional view taken substantially along line 7—7 of FIG. 5;

FIG. 8 is a perspective view, partially broken away, of a curtain member which includes an elongated weighted rod for maintaining the curtain member taut; and FIG. 9 is a fragmentary view which shows the connection between the weighted rod and the curtain member.

DESCRIPTION OF THE PREFERRED EMBODIMENTS

The seal construction 10 and 10' of the present invention is for sealing the spaces between the opposite sides of platform 11 of dock leveler 12 and the opposite sides 13 of pit 14 associated with the dock leveler, considering that there are open clearance spaces X (FIG. 4) therebetween when the platform is level or tilted downwardly into the pit, and there are very large openings therebetween when the platform is elevated, as in FIG. 1. As is well understood, the platform 11 is hinged at 15 to the floor 18 of a warehouse or the like. A hydraulic piston and cylinder unit 17 has one end secured relative to the floor 18 of pit 14 at 19 and the other end secured to the underside of platform 11 at 20. Side plates 21 extend downwardly from platform 11 and are received in contiguous relationship to sides 13 of pit 14 when platform 11 is in a horizontal position as shown in FIG. 2. All of the foregoing is conventional in the art and forms no part of the present invention other than providing the background structure with which the improved dock leveler seal construction is used.

At this point it is to be noted that only the seal 10 at the right side of FIG. 1 will be described but that the seal 10' is the mirror image counterpart of seal 10 and accordingly will bear primed numerals which designate parts which correspond to the unprimed numerals associated with seal 10.

The seal 10 essentially comprises a generally triangular shaped curtain member 22 (FIG. 5) which may be fabricated from a plasticized canvas-like material known under the tradename HYPALON, or any similar type of fabric, except that apex portion of the triangular material has been cut away at 23, and, further, the front edge 24 is of the configuration shown in FIG. 5, rather than straight. The generally triangular curtain member 22 includes side edges 25 and 26 which are bent over and sewn to form hems at 27 and 29, respectively. Male hook-type fasteners in strip form 30 and 31 are sewn along side edges 25 and 26 on hems 27 and 29, respectively (FIGS. 4 and 6). The hook fasteners are known under the tradename VELCRO. A sewn hem is also formed at 32 at the rear edge of curtain member 22 and a sewn hem 33 is formed at the front edge 24 and is filled with foam-like resilient plastic or rubber material 34. Front edge 24 includes two straight portions 35 and 36 which intersect at 37 and thus form an obtuse angle with each other. The foam material 34 extends throughout hem 33 from edge 25 to edge 26.

Loop fastener strips 39 and 40 are suitably secured, as by adhesive, or in any other suitable manner, to the upper edge 41 of pit side 13 and edge portion 42 of platform 11, respectively. Loop fastener strips 39 and 40 are known as VELCRO and constitute the female member for receiving the male hook members in engagement. It can thus be seen that curtain member 22 is detachably secured along one edge to the edge of the platform and along another edge to the upper edge of the pit side wall. Thus, as the platform 11 moves between the positions shown in FIGS. 1 and 2, the curtain member 22 will assume the positions shown therein, and when the platform 11 is elevated, curtain 22 will obstruct the otherwise present opening between the side edge 42 of the platform and the side edge 41 of the pit. In addition, curtain 22 will obstruct the clearance opening X (FIG. 4) between the side of the platform and the side 13 of the pit when the platform extends downwardly into pit 14 and when platform 12 is level. As is understood, there is a clearance opening X on both sides of the platform and each clearance opening X extends from the rear of the platform proximate the hinge to the front edge of the platform.

As noted above, the obstructing of the open space between the side of the platform and the side of the pit prevents loss of air conditioning in summer and loss of heat in winter. In addition, it provides a barrier against entry of insects and rats, and, further, prevents refuse of all kinds from being shoved off of the portions of floor 18 above sides 13 from falling into pit 14. In this respect, any such refuse would be caught in curtain member 22 which can be periodically detached because of the detachable connection provided by the VELCRO fasteners, as described above, and cleaned, and thereafter reattached in an extremely simple manner.

As can be seen from FIG. 5, the front edge 24 includes straight portions 35 and 36 which intersect at an obtuse angle. When the curtain member 22 is folded over as shown in the position of FIG. 2, that is, when fastener strips 31 and 30 lie alongside each other, the foam-filled front edges 35 and 36 will extend perfectly vertically to block the open space between the sides of the platform and the sides of the pit at the front of the platform. Even when the platform is not horizontal but extends downwardly into the pit, one or both foam-filled edge portions 35 or 36 will block this opening by lying across it.

In FIGS. 8 and 9 a modified construction is shown wherein an elongated metal rod 44 has its end 45 secured to curtain 22 at 46. In this respect, a grommet 47 is secured to curtain 22 to receive the reduced end portion 49 of rod 44 and a nut 50 is secured to the reduced end portion 49 as shown to maintain the rod and curtain in assembled relationship. Therefore, as curtain member 22 assumes different positions, member 49 can pivot within grommet 47 and rod 44 can roll about its longitudinal axis. Rod 44 may be between ¼ inch and ½ inch in diameter and is the length of the curtain member 22, which may be about 8 feet. The rod 44 adds weight to curtain member 22 to maintain it more taut than it can be maintained by the weight of the curtain alone.

As noted briefly above, only the curtain member 22 and its associated structure on the right side of FIG. 1 has been described. It will be appreciated that the dock leveler seal also includes a mirror image counterpart of curtain member 22, and the structure associated therewith, and the left side of FIG. 1 shows this counterpart curtain member which is depicted by numeral 22'. Curtain member 22' is the mirror image of curtain member 22 of FIG. 5 in all respects, and, further, it is associated with VELCRO strips which are mirror image counterparts of strips 39 anad 40 of FIG. 4 and which are secured to the opposite side edges of the platform and pit.

It can thus be seen that the dock leveler seal construction of the present invention is manifestly capable of achieving the above enumerated objects and while preferred embodiments of the present invention have been disclosed, it will be appreciated that it is not limited thereto but may be otherwise embodied within the scope of the following claims.

What is claimed is:

1. In a dock leveler having a platform with first opposite sides which move vertically relative to second opposite sides of a pit adjacent said first opposite sides of said platform, a seal construction comprising a pair of curtain members each having first and second edges, first means for securing one of each of said first edges to one of each of said first opposite sides of said platform, second means for securing one of each of said second edges to one of each of said second opposite sides of said pit, said curtain members having a sufficient expanse between said first and second edges so that they block the openings between said first sides of said platform and said second sides of said pit in all positions of said platform.

2. In a dock leveler as set forth in claim 1 wherein said first means detachably secure said first edges to said sides of said platform.

3. In a dock leveler as set forth in claim 1 wherein said second means detachably secure said second edges to said sides of said pit.

4. In a dock leveler as set forth in claim 3 wherein said first means detachably secure said first edges to said sides of said platform.

5. In a dock leveler as set forth in claim 4 wherein said first and second means comprise hook and loop type fasteners.

6. In a dock leveler as set forth in claim 1 wherein said curtains includes front edges which extend between said first and second edges, said front edges being of a configuration so that at least a portion thereof always provides sealing of the openings between the sides of the platform and the sides of the pit.

7. In a dock leveler as set forth in claim 6 including padding in said front edges.

8. In a dock leveler as set forth in claim 6 wherein said front edges comprise two straight portions which intersect at an obtuse angle.

9. In a dock leveler as set forth in claim 6 wherein said first means detachably secure said first edges to said sides of said platform.

10. In a dock leveler as set forth in claim 6 wherein said second means detachably secure said second edges to said sides of said pit.

11. In a dock leveler as set forth in claim 10 wherein said second means detachably secure said second edges to said sides of said pit.

12. In a dock leveler as set forth in claim 1 including an elongated rod-like weight carried loosely within each of said curtain members when said curtain member is folded, to thereby aid in maintaining said curtain members taut when said platform is elevated.

13. In a dock leveler as set forth in claim 12 wherein said platform has front and rear edges and is pivoted at said rear edge, and wherein said curtain members are generally triangular in shape with said first and second edges forming the sides of said generally triangular shape and terminating at an apex portion, and attachment means for securing an end of each of said elongated rod-like weights to said curtain members proximate said apex portion while permitting the remainder of said elongated rod-like weights to lie unsecured relative to said curtain members.

14. In a dock leveler as set forth in claim 13 wherein said attachment means comprise pivotal connections between said ends of said elongated rod-like weights and said curtain members.

15. In a dock leveler as set forth in claim 14 wherein each pivotal connection comprises a reduced end portion on said elongated rod-like weights, a grommet in each of said curtain members for receiving said reduced end portions, and means for retaining said reduced end portions within said grommet.

16. In a dock leveler as set forth in claim 1 wherein said platform has front and rear edges and is pivoted at said rear edge, and wherein said curtain members are generally triangular in shape with said first and second edges forming the sides of said generally triangular shape and terminating at an apex portion.

17. In a dock leveler as set forth in claim 16 wherein said first means detachably secure said first edges to said sides of said platform.

18. In a dock leveler as set forth in claim 16 wherein said second means detachably secure said second edges to said sides of said pit.

19. In a dock leveler as set forth in claim 18 wherein said first means detachably secure said first edges to said sides of said platform.

20. In a dock leveler as set forth in claim 16 wherein at least one of said curtains includes a front edge which extends between said first and second edges, said front edge being of a configuration so that at least a portion thereof always provides sealing of the openings between the sides of the platform and the sides of the pit.

* * * * *